United States Patent
Vignaux et al.

(10) Patent No.: US 6,644,232 B1
(45) Date of Patent: Nov. 11, 2003

(54) CABLE, IN PARTICULAR SEISMIC STREAMER, INCLUDING A PLURALITY OF CHAMBERS FORMING A NECKLACE FLOAT, AND TOOLS FOR FILLING, DEGASSING OR CONNECTING THE CHAMBERS OF THE CABLE

(75) Inventors: Jean-Jacques Vignaux, Villeneuve de Rivière (FR); Pascal Beuvelot, Pointis de Rivière (FR)

(73) Assignee: Sercel, Carquefou (FR)

( * ) Notice: Subject to any disclaimer, the term of this patent is extended or adjusted under 35 U.S.C. 154(b) by 0 days.

(21) Appl. No.: 09/657,717

(22) Filed: Sep. 7, 2000

(30) Foreign Application Priority Data

Sep. 7, 1999 (FR) .............................. 99 11168

(51) Int. Cl.$^7$ ................................ F15D 1/10
(52) U.S. Cl. ..................................... 114/243
(58) Field of Search ................ 114/242, 244, 114/253; 367/15, 20, 153, 154, 141; 174/101.5

(56) References Cited

U.S. PATENT DOCUMENTS 2,871,665 A * 2/1959 Brandt
4,135,141 A   1/1979 Caldwell et al.
4,541,079 A * 9/1985 Thigpen ................... 114/331
5,144,588 A   9/1992 Johnston et al.

FOREIGN PATENT DOCUMENTS

DE   2719951   11/1989
FR   2678465   12/1992

* cited by examiner

Primary Examiner—Ed Swinehart
(74) Attorney, Agent, or Firm—Blakely, Sokoloff, Taylor & Zafman

(57) ABSTRACT

A marine cable includes chambers forming a necklace float. For filling, degassing the chambers and for connecting two successive chambers, the cable includes an intervention orifice between the chambers and with which the chambers communicate. Connection of the chambers to the intervention orifice is controlled by two valve mechanisms which each include an obturator spring-loaded against a communication opening and a guide rod which, when the obturator closes the opening, lies partly in the intervention orifice so that it is possible to push back the rods of the valve mechanisms from the intervention orifice for selective connection of the intervention orifice to one or the other of the two chambers or with both at the same time.

9 Claims, 4 Drawing Sheets

FIG_1 (PRIOR ART)
CHAMBER A
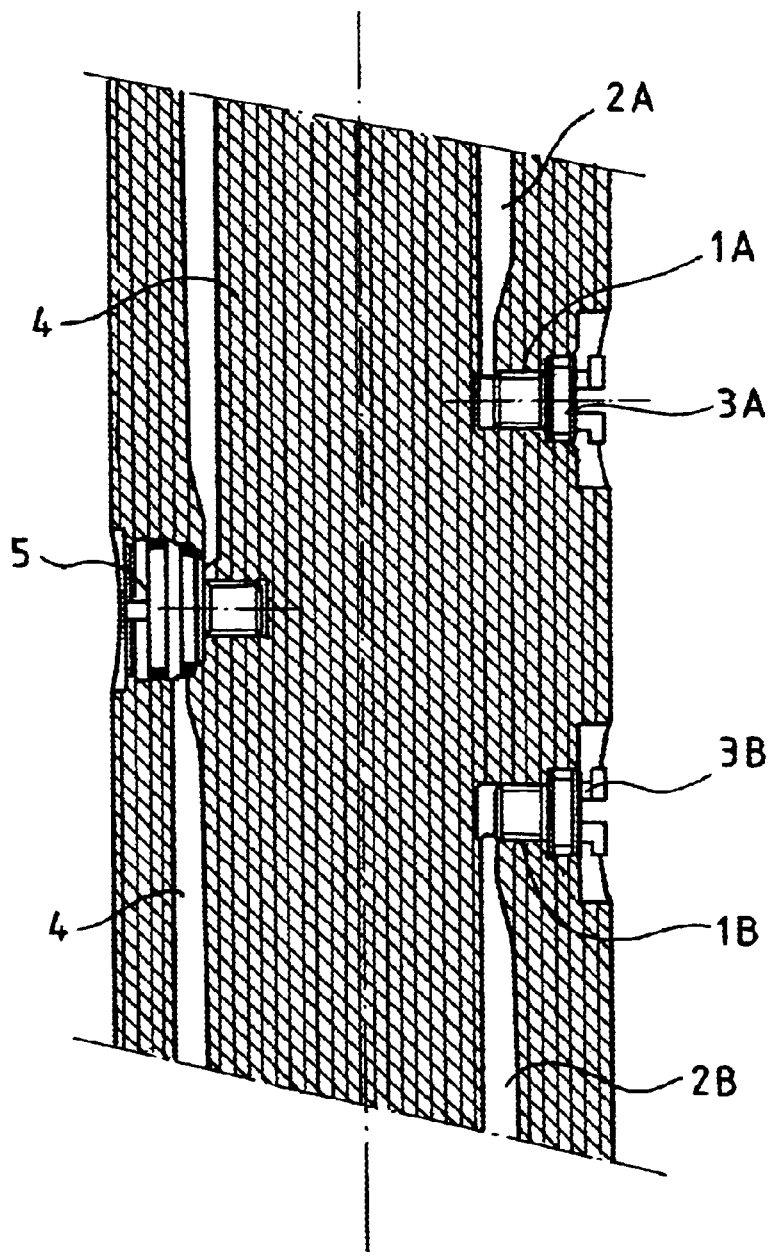
CHAMBER B

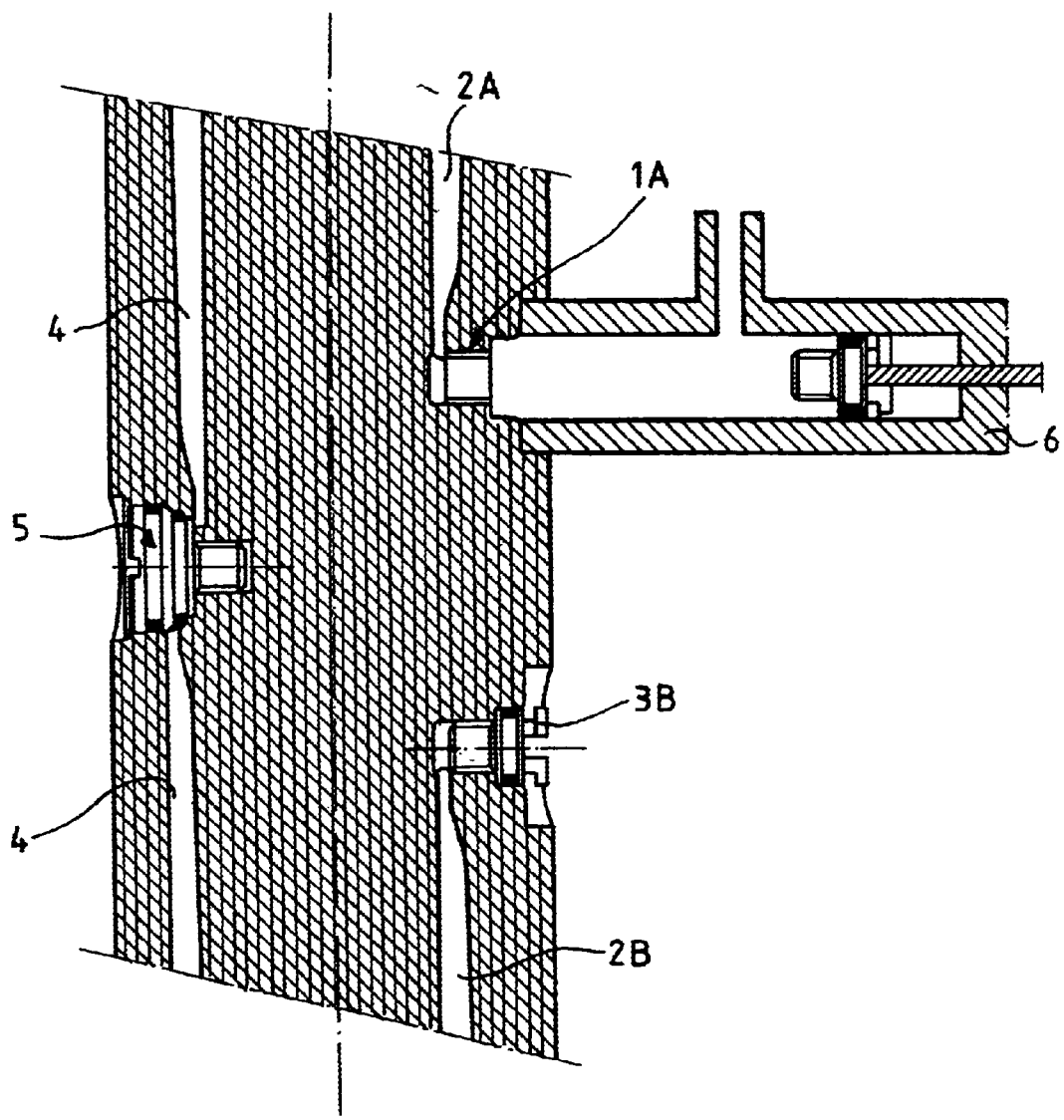
FIG_2 (PRIOR ART)

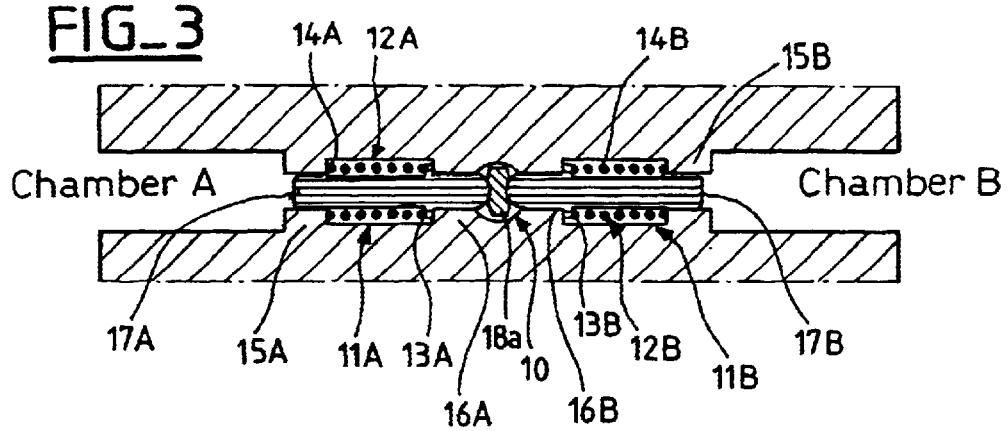
FIG_3
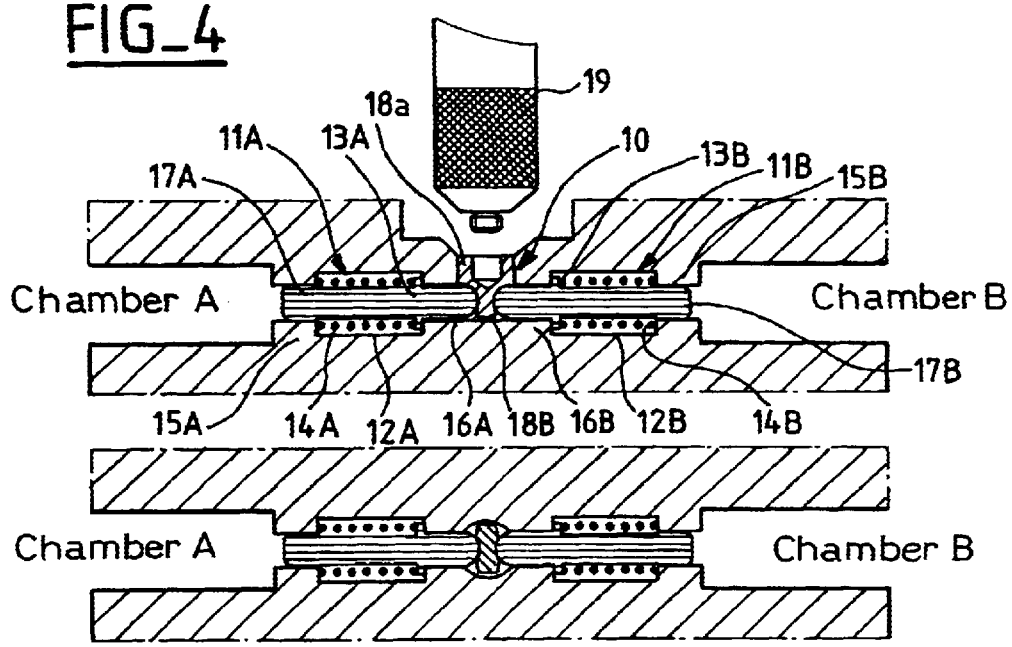
FIG_4
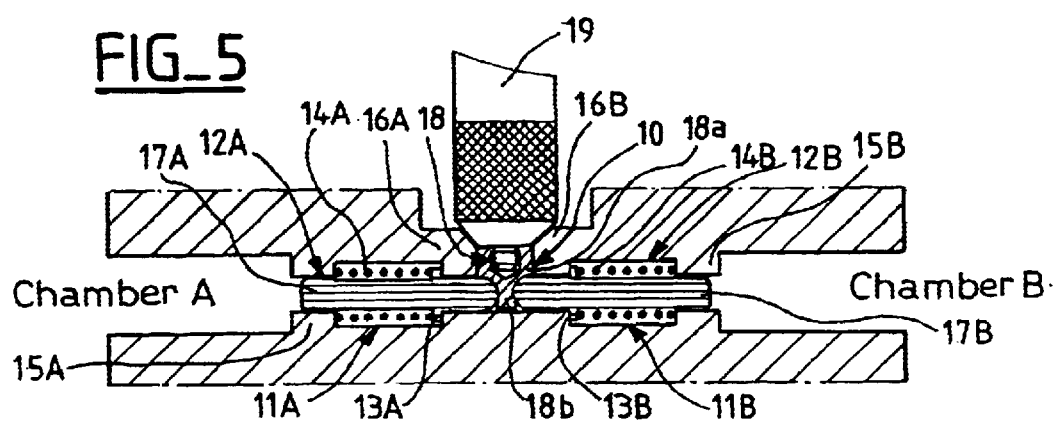
FIG_5

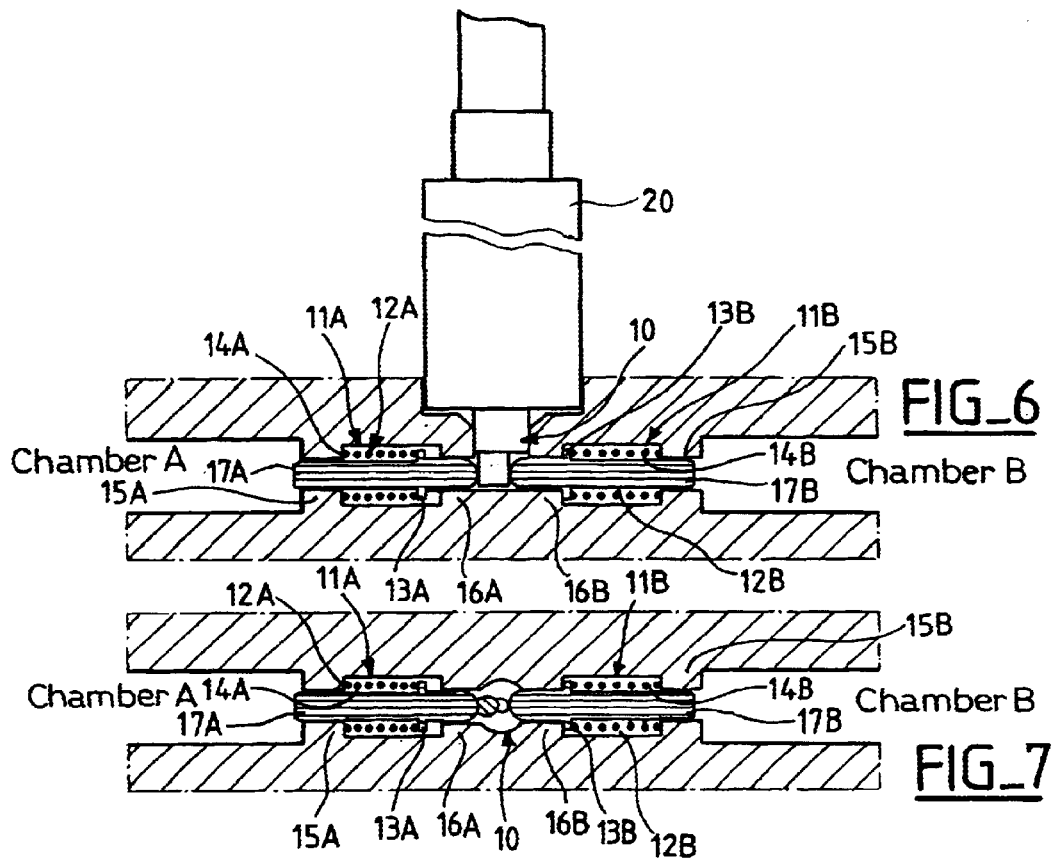
FIG_6
FIG_7
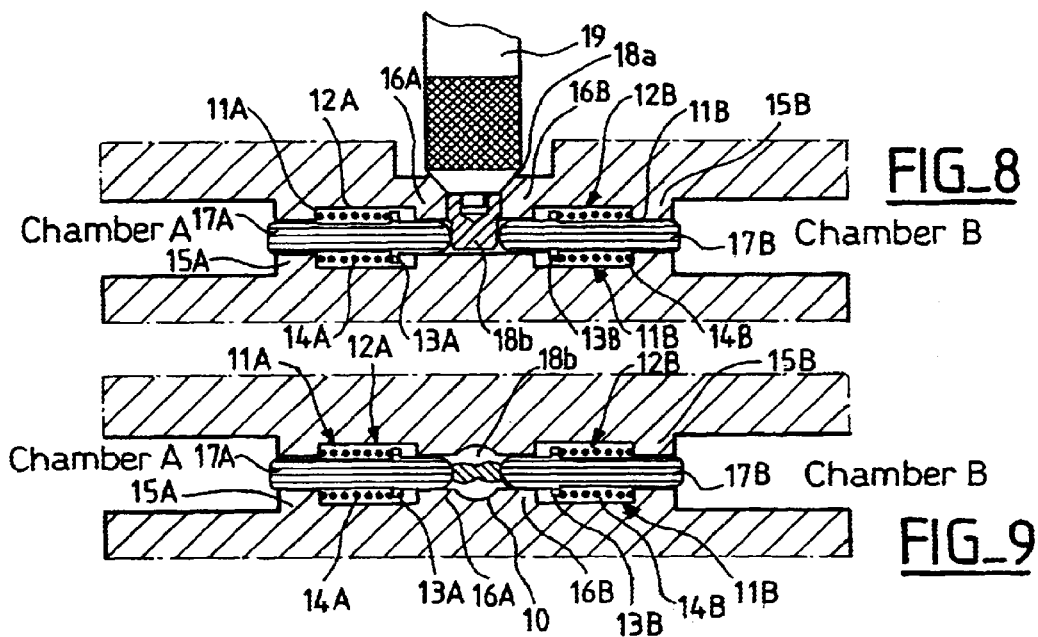
FIG_8
FIG_9

CABLE, IN PARTICULAR SEISMIC STREAMER, INCLUDING A PLURALITY OF CHAMBERS FORMING A NECKLACE FLOAT, AND TOOLS FOR FILLING, DEGASSING OR CONNECTING THE CHAMBERS OF THE CABLE

BACKGROUND OF THE INVENTION

1. Field of the Invention

The present invention relates to a cable, such as a seismic streamer, including a plurality of chambers forming a necklace float.

It also concerns tools for filling, degassing or connecting the chambers of the cable.

2. Description of the Prior Art

Cables referred to as seismic streamers are conventionally used for marine seismic surveying and carry sensors such as geophones or hydrophones. They are designed to be towed by a ship at sea to acquire seismic signals.

The cables include a plurality of chambers forming a necklace float which must be filled with gas, degassed or connected, according to the depth at which the seismic streamers are to be towed.

FIGS. 1 and 2 show diagrammatically a portion of a prior art cable between two successive chambers A and B of the cable.

As shown in FIGS. 1 and 2, each chamber A, B is generally associated with a filling/degassing orifice 1A, 1B which is specific to it and to which it is connected by a passage 2A, 2B.

Each orifice 1A, 1B cooperates with a screwthreaded closure plug 3A, 3B fitted with an O-ring.

To feed the chamber A the plug 3A is removed and a filling tool 6 is applied to the orifice 1A.

To feed the chamber B the plug 3B is removed and the filling tool 6 is applied to the orifice 1B.

The chamber A or the chamber B is degassed by removing the plug 3A or 3B from the corresponding orifice 1A, 1B.

Thus filling or degassing two successive chambers necessitates manipulation of the two plugs 3A, 3B.

A communication passage 4 is generally provided to connect the two chambers A, B and a stopper 5 fitted with an O-ring opens or closes the duct.

Connecting the two chambers A and B necessitates manipulation of the stopper 5, which constitutes a component separate from the plugs 3A, 3B.

An object of the invention is to propose a simpler design.

More particularly, the invention proposes a design whereby two successive chambers can be filled and degassed or connected via the same orifice.

SUMMARY OF THE INVENTION

The cable according to the invention is therefore a marine cable—in particular a seismic streamer—including a plurality of chambers forming a necklace float and means for filling, degassing the chambers and means for connecting two successive chambers, the means including an intervention orifice between the chambers and with which the chambers communicate, in which cable connection of the chambers to the intervention orifice is controlled by two valve mechanisms which each include an obturator pushed by spring means against a communication opening and a guide rod which, when the obturator closes the opening, lies partly in the intervention orifice so that it is possible to push back the rods of the valve mechanisms from the intervention orifice for selective connection of the intervention orifice to one or the other of the two chambers or with both at the same time.

The cable advantageously includes a plug adapted to close the communication orifice, the plug includes a closure base and, aligned with the base, a tapered part which is positioned between the guide rods when the plug is in place in the intervention orifice, and the tapered part has a shape and dimensions such that in a first angular position of the plug relative to the intervention orifice the larger section faces of the tapered part face the guide rods, which are in a position such that their obturators close their communication opening, whereas in another angular position, when they have been turned by one quarter-turn relative to the first angular position, the rods of the valve mechanism bear on the edges of the tapered part so that the obturators of the valve mechanisms are disengaged from the openings that they close, which connects the two chambers.

In particular, the base of the plug can include fixing means for fixing the plug to a tool for disengaging the plug from the intervention orifice or turning it by one quarter-turn. The fixing means can include an internally threaded fixing hole.

The tapered part of the plug advantageously has a cam profile on which the guide rods slide when the plug is turned in the intervention orifice.

The invention also proposes a system including at least one marine cable such as a seismic streamer including a plurality of chambers forming a necklace float and a tool for filling the chambers, one end of which includes a filler nozzle, wherein the cable is a cable of the aforementioned kind and the end, of the filling tool which includes a filler nozzle is adapted to be inserted into an intervention orifice and selectively to push back one or other of the rods of the valve mechanisms when the filling tool is turned one way or the other in the intervention orifice.

The system is advantageously completed by a tool adapted to cooperate with the means for fixing the plug(s) to disengage the plug(s) from the intervention orifice(s) or to turn the plug(s) by one quarter-turn in the orifice(s).

Other features and advantages of the invention will emerge from the following description. The description is purely illustrative and is not limiting on the invention. It should be read in conjunction with the accompanying drawings.

BRIEF DESCRIPTION OF THE DRAWINGS

FIGS. 1 and 2, already commented on, are diagrammatic sectional representations of a portion of a prior art seismic streamer between two float chambers.

FIG. 3 is a diagrammatic representation in axial section of a portion of one embodiment of a seismic streamer according to the invention.

FIGS. 4 to 6 are diagrammatic representations of the seismic streamer portion shown in FIG. 3, as seen in axial section on a plane perpendicular to that of FIG. 3, and show various steps of filling/degassing a chamber of the streamer.

FIG. 7 is a diagrammatic representation in section on the same section plane as FIG. 3, and shows the same steps as FIG. 6.

FIGS. 8 and 9 are diagrammatic representations of the same seismic streamer portion in axial section on two perpendicular planes, and show the connection of two successive chambers of the seismic streamer.

DETAILED DESCRIPTION OF THE PREFERRED EMBODIMENTS

FIGS. 3 to 9 show a portion of a marine cable, for example a seismic streamer, which includes two float chambers A and B.

The cable portion includes an intervention orifice 10 between the two chambers A and B and extending radially across the cable. The chamber A can be filled or degassed, the chamber B can be filled or degassed and the two chambers A and B can be connected via this intervention orifice.

To this end each of the two chambers A and B is connected to the orifice 10 by a communication orifice 11A, 11B in which a valve mechanism 12A, 12B is mounted.

To be more precise, each mechanism 12A, 12B includes an obturator 13A, 13B which is slidingly mounted in its respective communication orifice 11A, 11B and which is adapted to close a communication opening formed on an abutment 16A, 16B with which the obturator 13A, 13B comes into contact.

Each mechanism 12A, 12B includes a coil spring 14A, 14B which is compressed between the obturator 13A, 13B and an abutment 15A, 15B and pushes the obturator 13A, 13B towards the abutment 16a, 16B on which it bears.

The obturators 13A, 13B are mounted on rods 17A, 17B which extend through the abutments 15A, 15B and through the abutments 16A, 16B. The rods 17A, 17B extend beyond the abutments 16A, 16B inside the orifice 10.

A plug 18 closes the orifice 10.

The plug 18 has a cylindrical closure base 18a and a tapered portion 18b aligned with the base between the rods 17A, 17B.

The base 18a has an internally threaded fixing hole adapted to cooperate with the thread on a tool 19 for removing the plug 18 from the intervention orifice 10, as shown in FIGS. 4 and 5.

To fill one of the two chambers, for example the chamber A, the plug 18 is removed from the orifice 10 by means of the tool 9.

The end of a filling tool 20 is then inserted into the orifice 10 and turned by one quarter-turn to push back the rod 17A of the valve which closes the chamber A (FIGS. 6 and 7).

The obturator 13A is then disengaged from the abutment 16A, which opens the orifice 11A which connects the chamber A and the orifice 10.

The filling fluid is then injected through the tool whose end is in the orifice 10.

The pressure of the fluid is less than the pressure applied to the obturator 13B by the spring 14B and so the obturator 13B continues to bear against the abutment 16B and the chamber B remains closed during filling of the chamber A.

Once the chamber A has been filled, the tool 20 is turned by one quarter-turn and the tool 20 is then removed from the orifice 10. The valve mechanism 12A then closes and the obturator 13A is pressed against the abutment 16A.

The plug 18 is then replaced in the orifice 10 using the tool 19.

Once this operation has been completed, the extractor tool 19 is unscrewed from the plug 18.

The chamber B is filled in a symmetrical manner, of course.

The two chambers A and B are degassed by inserting the same tool 20 into the orifice and turning it by one quarter-turn to disengage the obturator 13A (respectively 13B) from the abutment 16A (respectively 16B). This opens the chamber A (respectively B) for long enough to degas it.

FIGS. 8 and 9 show how the two chambers A and B are connected.

They are connected by means of the extractor tool 19.

When the tool has been engaged with and fixed to the plug 18, the plug 18 is turned by one quarter-turn by means of the extractor tool 19 so that its tapered end 18b pushes back the rods 17A, 17B, which bear on the edges of the tapered end.

To this end, the tapered part 18b of the plug 18 has a cam profile on which the guide rods 17A, 17B slide when the plug is turned inside the intervention orifice.

The obturators 13A, 13B are consequently both disengaged from the abutments 16A, 16B and this connects the chambers A and B.

Note that because the plug 18 remains in place in the orifice 10, its base 18a prevents fluid leaking from the orifice 10.

When the operation is completed, the plug 18 is again turned by one quarter-turn. The two obturators 13A, 13B return to their position bearing against the abutments 16A, 16B.

What is claimed is:

1. A marine cable including a plurality of chambers forming a necklace float and means for filling, degassing said chambers and means for connecting two successive chambers, said means including an intervention orifice between said chambers and with which said chambers communicate, wherein connection of said chambers to said intervention orifice is controlled by two valve mechanisms which each include an obturator pushed by spring means against a communication opening and a guide rod which, when said obturator closes said opening, lies partly in said intervention orifice so that it is possible to push back said rods of said valve mechanisms from said intervention orifice for selective connection of said intervention orifice to one or the other of said two chambers or with both at the same time.

2. The cable claimed in claim 1, which includes a plug adapted to close said communication orifice, said plug includes a closure base and, aligned with said base, a tapered part which is positioned between said guide rods when said plug is in place in said intervention orifice, and said tapered part has a shape and dimensions such that in a first angular position of said plug relative to said intervention orifice the larger section faces of said tapered part face said guide rods, which are in a position such that their obturators close their communication opening, whereas in another angular position, when they have been turned by one quarter-turn relative to said first angular position, said rods of said valve mechanism bear on the edges of said tapered part so that said obturators of said valve mechanisms are disengaged from said openings that they close, which connects said two chambers.

3. The cable claimed in claim 2, wherein said base of said plug includes fixing means for fixing said plug to a tool for disengaging said plug from said intervention orifice or turning it by one quarter-turn.

4. The cable claimed in claim 3, wherein said fixing means include an internally threaded fixing hole.

5. The cable claimed in claim 2, wherein said tapered part of said plug has a cam profile on which said guide rods slide when said plug is turned in said intervention orifice.

6. The marine cable defined by claim 1 adapted for use as a seismic streamer.

7. The marine cable defined by claim 1 adapted for use in a system including at least one of said marine cables each including a plurality of chambers forming a necklace float and a tool for filling said chambers, one end of which includes a filler nozzle, and said end of said filling tool includes a filler nozzle adapted to be inserted into an intervention orifice and selectively to push back one or other of said rods of said valve mechanisms when said filling tool is turned one way or the other in said intervention orifice and is adapted to cooperate with complementary means of an extractor tool to fix said plug to said extractor tool.

8. The marine cable defined by claim 7, wherein said base of said plug includes fixing means for fixing said plug to a tool for disengaging said plug from said intervention orifice or turning it by one quarter-turn and said system includes a tool adapted to cooperate with said means for fixing said plug to disengage said plug from said intervention orifice(s) or to turn said plug by one quarter-turn in said orifice.

9. The marine cable defined by claim 8, wherein said fixing means include an internally threaded fixing hole.

* * * * *